March 22, 1960    E. B. ETCHELLS ET AL    2,929,591
RESILIENT MOUNTING
Filed Dec. 3, 1956
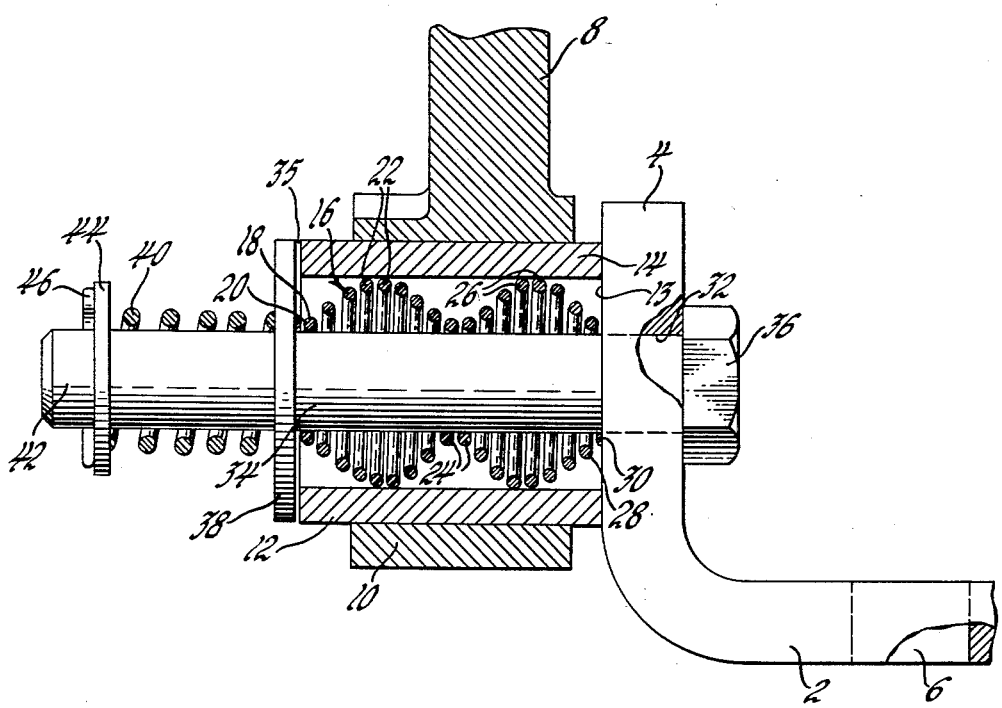
INVENTORS
Eugene B. Etchells &
BY Edward Gray
J. C. Thorpe
ATTORNEY United States Patent Office 2,929,591
Patented Mar. 22, 1960

2,929,591

RESILIENT MOUNTING

Eugene B. Etchells and Edward Gray, Birmingham, Mich., assignors to General Motors Corporation, Detroit, Mich., a corporation of Delaware Application December 3, 1956, Serial No. 625,677

1 Claim. (Cl. 248—15)

This invention relates generally to mounting structures and more particularly to mounting structures in which it is necessary to damp or cushion the vibrations, to which the supporting structure may be subjected, from the piece or assembly to be mounted on the supporting structure. The invention, although not necessarily limited thereto, is specifically concerned with the problem of mounting an automobile generator on the engine in a manner to damp and cushion the transmittal of the engine vibrations to the generator.

In the past it has been the custom to mount engine generators merely by the use of "loose pins" between the mounting bracket fixed to the engine and the usual bosses in the generator housing. This type of connection has resulted in rattling which is not only noisy but causes excessive wear in the mounting parts of the assembly as well as in the belt and other parts of the generator. Improvements have been attempted in these mounting connections between the mounting bracket and the generator housing through the use of resilient rubber bushings. It has been found, however, that such bushings are subject to deterioration under the influence of the heat that is normally present around an internal combustion engine. It has further been found that the use of rubber bushings substantially increases the cost of such mountings.

The present invention therefore proposes a unique mounting which utilizes "hour-glass" springs in such connections. These springs are extremely easy and inexpensive to make since they comprise a simply wound and tensed coil. Furthermore, such bushings are not subject to deterioration under the influence of heat. It has also been found that additional damping and greater vibration absorption is provided with the unique "hour-glass" spring mounting connection which forms the subject of this invention.

For a fuller understanding of the invention and the objects thereof, reference is made to the accompanying detailed description and the drawing, in which the single figure is a view in elevation with parts broken away and in section illustrating a resilient mounting assembly which embodies the invention.

Referring now to the drawing, a bracket 2, only a portion of which is shown, has an upstanding leg or foot 4. Bracket 2 may be secured to an engine or other suitable support by studs (not shown) inserted through the holes 6 provided therein. A generator, only again a portion of which is shown, which includes the housing 8 having bosses 10 thereon for fastening, is provided with a bushing 12 pressed or otherwise fixed in the boss 10. The bushing 12 has its one end 14 juxtaposed with respect to the leg 4 so that the axis of the boss is normal to a longitudinally facing surface 13 of leg 4 of the bracket 2 and an end of bushing 12 abuts leg 4. Assembled in the bushing 12 is an "hour-glass" spring 16 whose coils 18 beginning at end 20 are relatively small and gradually increase in diameter to the maximum of coils 22, then gradually decrease to the minimum of coils 24 which are of substantially the same diameter as coil 20, and again increase to a maximum as indicated by the coils 26 and then again gradually decrease to a minimum coil 28 at the opposite end 30 of spring 16. The end 30 of spring 16 abuts the longitudinally facing surface 13 of the leg 4. Extending through the coils of spring 16 and also through a hole 32 provided in leg 4 is a stud or pin 34 having a head 36 formed thereon to retain it in proper longitudinal or axial relation with respect to the spring 16 and the leg 4. It will be observed from the drawing that the diameter of the coils 22 and 26 have substantially the same outer diameter as the internal or inner diameter of the bushing 12. Similarly, the inner diameters of the coils 18, 24 and 28 are substantially the same as the outer diameter of the pin or stud 34. The "hour-glass" spring 16 is slightly longer than the bushing 12 so that it extends slightly beyond one end of the bushing as indicated by the clearance 35 between a washer 38 and the end of bushing 12. The stud 34 has mounted thereon the washer or plate 38 which abuts the end of the "hour-glass" spring 16. This washer loads the "hour-glass" spring 16 by means of a second helical coil spring 40 which is also mounted on an end 42 of the stud or pin 34 where it is interposed between the washer 38 and a second washer 44 retained from sliding off the end 42 by means of a cotter key 46. The spring 40 loads washer 38 and "hour-glass" spring 16 so as to increase the frictional forces acting between the coils of the hour-glass spring 16 and also between the bushing 12 and the coils 22 and 26. This increased friction, it has been found, prevents rattling and aids damping of the vibrations to which the bracket 2 may be subjected, thereby providing greater life for the generator and the parts thereof as well as the parts of the mounting itself.

In addition to the above advantages of such a mounting, a simple and cheap construction has been obtained which does not deteriorate under the influence of heat or other corrosive materials such as oil as is the case with mounting assemblies which use rubber bushings. Furthermore, any degree of damping is easily and quickly obtainable by any one of a plurality of simple expedients, i.e., varying of loading or characteristic of spring 40 by changing its size or the distance between washers 38 and 44, etc.

Although the invention has been described as particularly adapted for use between a generator mounting bracket adapted to be secured to an engine and an automobile generator, it will be readily appreciated that the inventive principle of such mounting is adaptable for innumerable uses and is not limited to the example set forth in the specification and drawing.

We claim:

A mounting connection between a mounting bracket having an upstanding leg thereon and a member including a boss in juxtaposed position with respect to said leg comprising an "hour-glass" continuously wound helical coil spring in said boss wherein the coils of said spring beginning with a minimum diameter at the ends thereof gradually increase in size to a maximum diameter and then decrease in size to said minimum between the coils of said maximum diameter, said spring having one end abutting said leg at one end of said boss and the opposite end extending slightly beyond the opposite end of said boss, the diameters of the largest of the coils of said spring being substantially the same as the inner diameter of said boss, a stud extending through said leg and said spring whose diameter is substantially the same as the inner diameters of the smallest of the coils of said spring, and resilient means on said stud engageable with the opposite end of said spring to preload said spring so as to increase the frictional forces between the outer coils of said spring and said boss and to yieldably accommodate elongation of said spring in response to increased radial loading of said spring between said boss and stud upon vibration of the bracket.

References Cited in the file of this patent

UNITED STATES PATENTS

| | | |
|---|---|---|
| 394,007 | Pfeil | Dec. 4, 1888 |
| 1,543,769 | Hewlett | June 30, 1925 |
| 2,091,842 | West | Aug. 31, 1937 |

FOREIGN PATENTS

| | | |
|---|---|---|
| 616,294 | France | Oct. 26, 1926 |